United States Patent [19]
Eike et al.

[11] Patent Number: 5,738,142
[45] Date of Patent: Apr. 14, 1998

[54] PRESSURE HOLDING DIRECTIONAL CONTROL VALVE

[75] Inventors: Craig R. Eike, DeKalb; Guy T. Stoever, Naperville, both of Ill.

[73] Assignee: Case Corporation, Racine, Wis.

[21] Appl. No.: 694,559

[22] Filed: Aug. 9, 1996

[51] Int. Cl.$^6$ .................................................. F15B 13/044
[52] U.S. Cl. .................. 137/596.17; 91/447; 251/129.14
[58] Field of Search .................. 91/447; 137/596.17; 251/129.14

[56] References Cited

U.S. PATENT DOCUMENTS

| | | |
|---|---|---|
| 2,868,494 | 1/1959 | Kearns, Jr. et al. . |
| 3,943,824 | 3/1976 | Fletcher .................. 91/447 X |
| 4,088,151 | 5/1978 | Schurger .................. 91/447 X |
| 4,569,273 | 2/1986 | Anderson et al. .......... 91/447 |
| 4,620,565 | 11/1986 | Brown . |
| 4,640,391 | 2/1987 | Machara et al. . |
| 4,712,767 | 12/1987 | Losser et al. . |
| 4,765,693 | 8/1988 | Stegmaier . |
| 4,859,005 | 8/1989 | Rey et al. . |
| 4,936,344 | 6/1990 | Gilbert et al. . |
| 4,938,545 | 7/1990 | Shuey et al. . |
| 5,076,323 | 12/1991 | Schudt . |
| 5,104,091 | 4/1992 | Rathay et al. . |
| 5,118,077 | 6/1992 | Miller et al. . |
| 5,145,148 | 9/1992 | Laurent . |
| 5,234,030 | 8/1993 | Kervagoret et al. . |
| 5,261,731 | 11/1993 | Yogo et al. . |
| 5,299,859 | 4/1994 | Tackett et al. . |
| 5,333,947 | 8/1994 | Kervagoret . |
| 5,358,320 | 10/1994 | Fuchida . |
| 5,410,943 | 5/1995 | Kervagoret . |
| 5,458,150 | 10/1995 | Tamaoki et al. . |
| 5,467,797 | 11/1995 | Seetharaman et al. . |

Primary Examiner—Gerald A. Michalsky
Attorney, Agent, or Firm—Foley & Lardner

[57] ABSTRACT

A 2-position, 3-way directional control valve is described which prevents reverse flow from an actuator port to a pressure port in one position. In the preferred embodiment described, the valve is solenoid actuated and is spring biased to a drain position, wherein an extension central to a spool assembly penetrates through a check valve seat and lifts a check valve ball from its seat to permit flow from an actuator port to a drain port. In the actuated or energized position, an armature assembly is shifted by a solenoid, drawing the spool assembly within the valve body and establishing a fluid path between a pressure port and the actuator port. In this position the extension of the spool assembly is withdrawn from the check valve seat. The check valve can be unseated by pressure from the pressure port to permit flow from the pressure port, through the spool and the check valve assembly. In the event of loss of pressure from the pressure port, such as due to shifting of other valves coupled to a pressure source, the check valve reseats to prevent reverse flow from the actuator port to the pressure port. The valve assembly is preferably configured as a cartridge valve for use in pre-drilled manifolds.

20 Claims, 3 Drawing Sheets

5,738,142

1

PRESSURE HOLDING DIRECTIONAL CONTROL VALVE

BACKGROUND OF THE INVENTION

The present invention relates generally to a hydraulic directional control valve adapted to maintain and hold a pressure in the event of a partial or total pressure loss from a pressure source. More particularly, the invention relates to a pressure-holding cartridge valve configured to maintain pressure at an actuator port in an energized position in the event of loss of pressure from a source coupled to the pressure port of the valve.

A number of applications exists for hydraulic circuits including a solenoid-operated control valve associated with a check valve to maintain pressure at an actuator or end application. One such application involves load-holding operations, such as parking brakes and the like. In such circuitry, it is common to provide a check valve in a conduit from a source of pressurized fluid upstream of a directional control valve, such as a 2-position, 3-way solenoid-operated valve. When the directional control valve is de-energized, pressure from the pressure source is blocked and the actuator port is allowed to drain to a tank line. When the valve is energized or shifted to a pressurized position, the inlet line from the pressure source is coupled to the actuator outlet port and the tank port is blocked. Due to the presence of the check valve in the pressure line, unexpected loss as a pressure from the pressure source will not result in loss of pressure from the actuator line. Instead, temporary loss of pressure from the pressure line (or reduction of pressure in the pressure line below the pressure in the actuator line) will cause the check valve to seat and effectively hold fluid pressure to the actuator.

While hydraulic circuits of the type described above are useful, heretofore known circuits of this type have generally required multiple components which must be bought and assembled into a package separately. Where the hydraulic valving in the circuit is to be assembled in a manifold arrangement, separate envelopes must generally be drilled, tapped and routed within the manifold to accommodate both the directional control valve and the check valve. Other arrangements are generally known in the art for stacking check valves and directional control valves in layered circuits, but these also require separate assembled valve units. Moreover, certain valve structures have been proposed including a 2-way directional control valve incorporating an integral check valve for holding pressure at a load. Such valves, for example, find application an anti-lock braking systems and similar circuits. However, such designs are generally not useful for applications requiring actuation from a constant pressure source, such as a vehicular hydraulic system of the type found on off-road equipment and similar mobile hydraulic circuits.

There is a need, therefore, for an improved load-holding directional control valve incorporating in a single package a 2-position, 3-way, solenoid-actuated directional control valve and a load-holding check valve. In particular, there is a need for a valve of this type that can be simply and straightforwardly incorporated into a cartridge valve type structure for use in manifolded hydraulic circuits.

SUMMARY OF THE INVENTION

The present invention provides an innovative control valve structure designed to response to these needs. The control valve includes a spool biased into a first position to establish a normally open or normally closed flow path. The spool may be shifted to a second position through energization of a solenoid coil. The spool structure includes an extension for unseating a check valve for allowing reverse flow through the directional control valve in a de-energized position. In the energized position, the check valve is urged from its seat by flow through the directional control valve based upon a pressure differential from the pressure source to the actuator port. When pressure from the pressure source is reduced below that currently at the actuator, the check valve is urged into a reverse flow-preventing position in which an element of the check valve reseats to prevent loss of pressure from the actuator port.

Thus, in accordance with the first aspect of the invention, a reverse flow-preventing directional control valve is provided that includes a valve body, a spool assembly, a solenoid assembly and a check valve. The valve body has pressure, drain and actuator ports that may be plumbed to a pressure source, a reservoir and an actuator. The spool assembly is slidable within the valve body between a first position wherein a flow path is defined between the pressure port and the actuator port, and a second position wherein a flow path is defined between the actuator port and the drain port. The solenoid assembly includes a solenoid coil energizable and de-energizable for shifting the spool assembly between the first and second positions. The check valve is positioned within the valve body for permitting flow from the pressure port to the actuator port and for preventing flow from the actuator port to the pressure port when the spool assembly is in the first position.

In accordance with another aspect of the invention, a reverse flow preventing cartridge valve includes a cartridge body, a shifting element, a control assembly and a check valve assembly. The body of the valve has pressure, drain and actuator openings. The shifting element is positioned within the body and is selectively movable between an actuated position and a drain position. The shifting element and the cartridge body cooperate to define a first fluid path between the pressure and actuator openings in the actuated position and a second fluid path between the actuator and drain openings in the drain position. The control assembly is operative to move the shifting element between the actuated and drain positions. The check valve assembly is positioned within the cartridge body in the first fluid path to permit flow from the pressure opening to the actuator opening and to prevent flow from the actuator opening to the pressure opening.

In accordance with still another feature of the invention, a reverse flow preventing directional control cartridge valve includes a valve body, a spool assembly and a check valve assembly. The valve body includes a solenoid assembly coupled at a first end thereof, an actuator port situated at a second end thereof opposite to the first end, and pressure and drain ports situated at intermediate positions therealong between the first and second ends. The spool assembly is slidable within the valve body between a pressure position and a drain position. The spool and the valve body cooperate to define fluid paths between the pressure and the actuator ports in the pressure position and between the actuator and drain ports in the drain position. The check valve assembly is positioned adjacent to the second end of the valve body and is operative in the pressure position of the spool assembly to permit fluid flow from the pressure port to the actuator port and to prevent fluid flow from the actuator port to the pressure port. The check valve is maintained in an unseated state in the drain position of the spool assembly.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
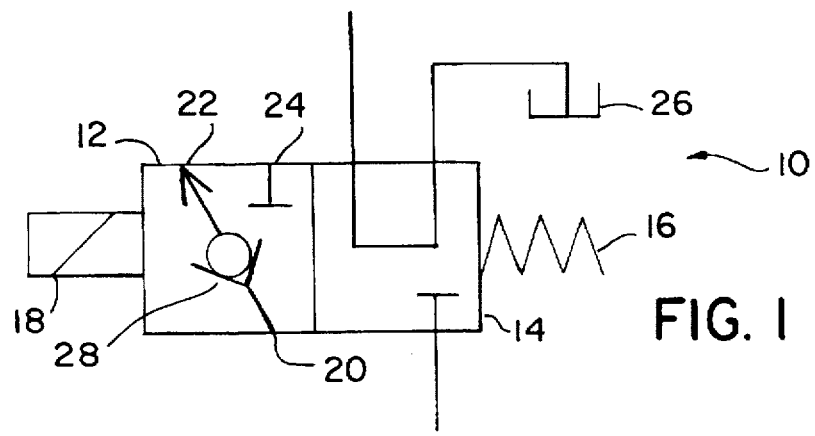
FIG. 1 is a hydraulic schematic of a reverse flow-preventing directional control valve in accordance with the invention.

Referring now to the figures and turning first to FIG. 1, a reverse flow preventing directional control valve is indicated symbolically and designated by the reference numeral 10. Valve 10 includes two envelope positions, a first envelope position 12 referred to hereinafter as the pressure position and a second envelope position 14 referred to hereinafter as the drain position. In the presently preferred embodiment illustrated in the figures, valve 10 is biased into the drain position 14 by means of a biasing spring 16 and can be actuated by energizing a solenoid 18 thereby shifting the valve to the pressure position 12. Valve 10 has three ports, including a pressure port 20, an actuator port 22 and a drain or tank port 24. In the pressure position 12, pressure port 20 is coupled through valve 10 to actuator port 22 and drain port 24 is blocked. In drain position 14, pressure port 20 is blocked and actuator port 22 is in fluid communication with drain port 24 for draining of fluid from an actuator (not shown) to a reservoir 26. Valve 10 further includes a check valve assembly 28 active in the pressure position for preventing reverse flow from actuator port 22 to pressure port 20 as described in greater detail below.

Figure 2:
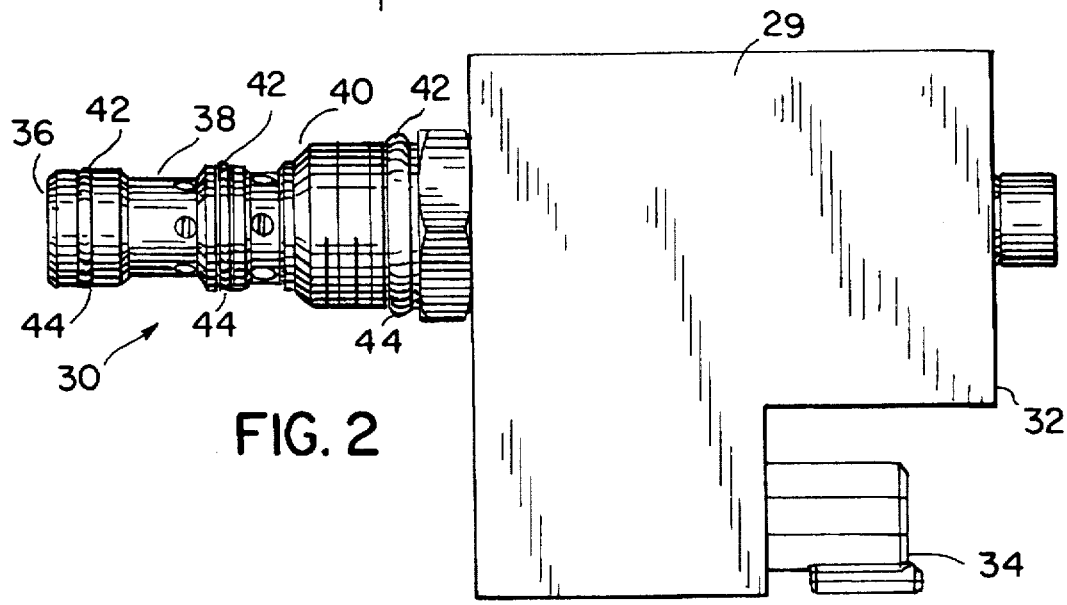
FIG. 2 is a side elevational view of a cartridge valve and solenoid structure including functional elements corresponding to the diagrammatical representation of FIG. 1.

FIG. 2 illustrates a presently preferred cartridge configuration for valve 10. In this configuration, valve 10 includes a solenoid coil assembly 29 and a cartridge valve body 30. Coil assembly 29, in turn, includes a coil housing 32 and a connector assembly 34 for applying power to the coil for shifting valve 10 between its operative positions. Valve body 30 includes three operative sections divided along its length, including an actuator section 36, a drain section 38 and a pressure section 40. Sections 36, 38 and 40 are isolated from one another by means of o-rings or similar sealing devices 42 fitted within appropriate grooves 44 between the relative sections.

Figure 3:
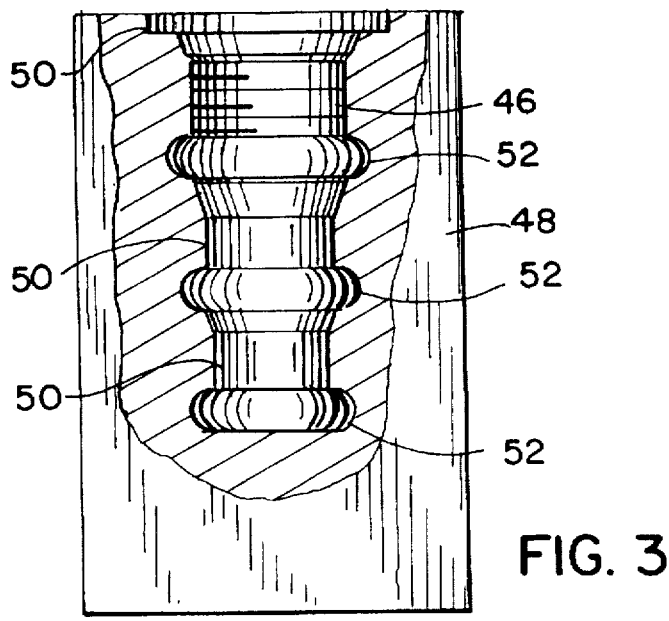
FIG. 3 is a cutaway view of an envelope for the cartridge valve illustrated in FIG. 2, such as may be used in a manifold-based hydraulic circuit incorporating the valve of FIG. 2.

Cartridge valve body 30 is adapted for sealing engagement in a drilled and tapped envelope 46 as illustrated in FIG. 3. Envelope 46 is formed in a manifold structure 48 which may be independent of other valving or may be one of several envelopes interconnected in a larger circuit manifold structure in a manner well known in the art. Envelope 46 includes a series of lands 50 designed to contact and sealingly engage seals 42 on cartridge valve body 30 when body 30 is inserted and secured within envelope 46 such as by threaded engagement. Moreover, envelope 46 is formed with fluid conduit regions 52 surrounding each of actuator, drain and pressure sections 36, 38 and 40 upon engagement of valve body 30 in envelope 46. In a manner well known in the art, regions 52 are plumbed internally in manifold 48 to channel pressurized fluid to and from ports 20, 22 and 24 of valve 10.

Figure 4:
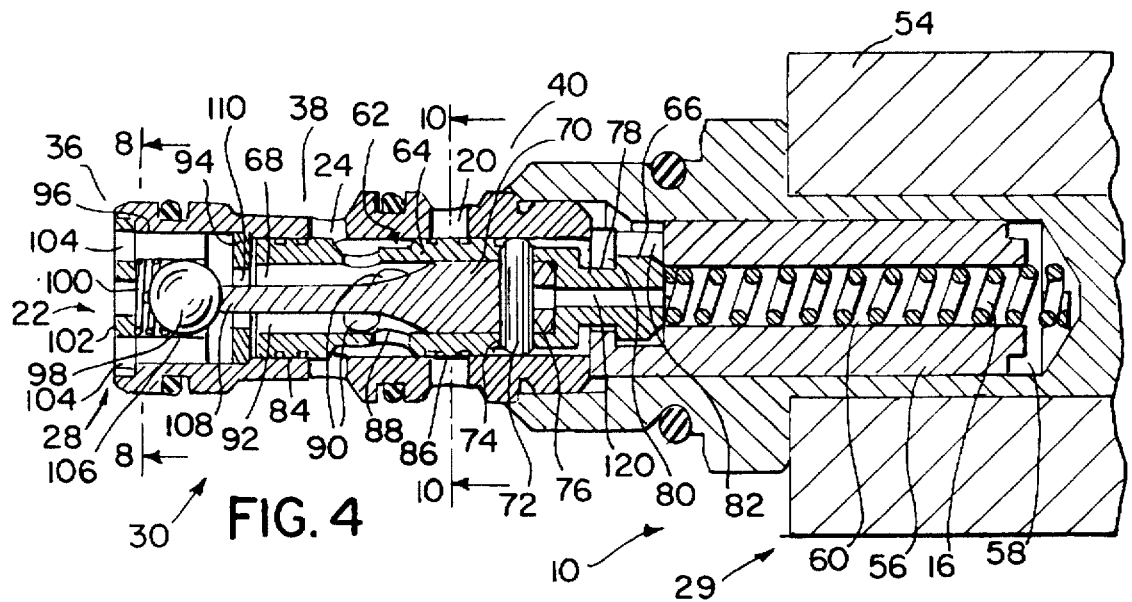
FIG. 4 is a partial sectional view of the cartridge valve structure shown in FIG. 2 in a de-energized position.
Figure 5:
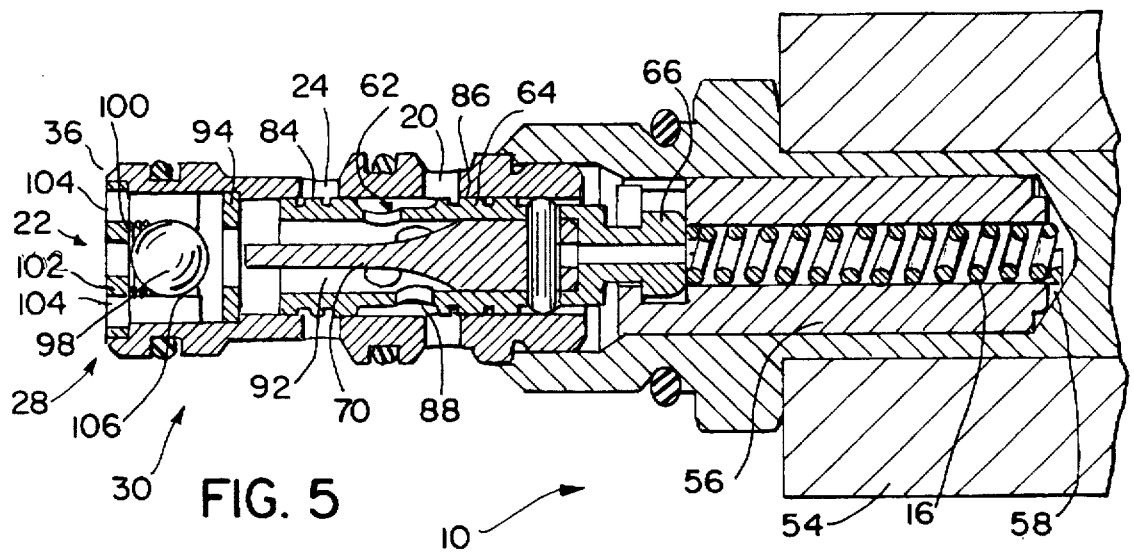
FIG. 5 is a cutaway view of the valve shown in FIG. 4 in an energized and flowing position.
Figure 6:
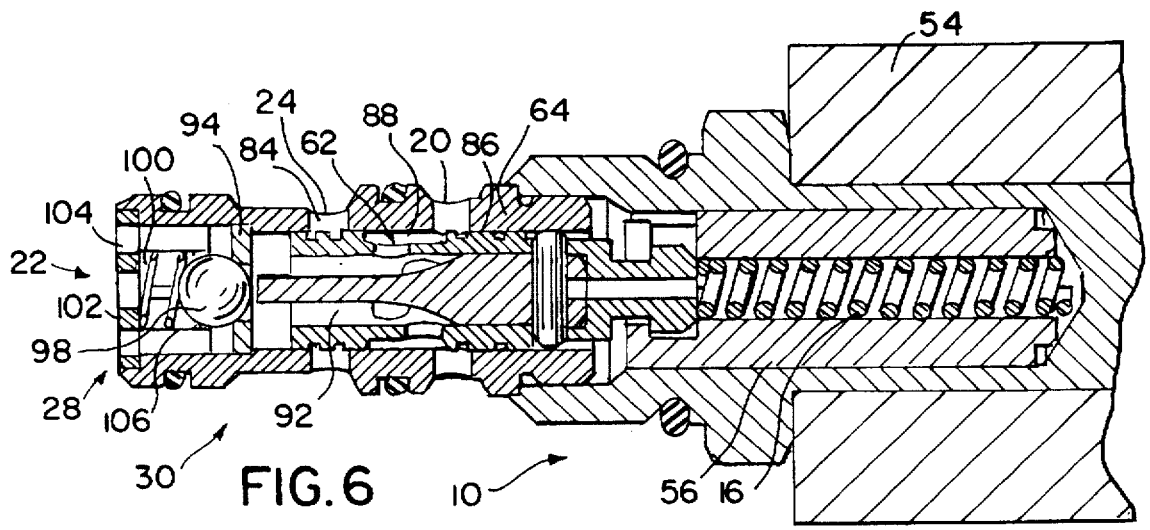
FIG. 6 is a cutaway view of the valve of FIGS. 4 and 5 in an energized position, wherein the check valve has been forced to its seat to prevent reverse flow through the directional control valve section.

FIGS. 4, 5 and 6 illustrate a partially sectioned view of valve 10 including the structures internal to cartridge valve body 30. In FIG. 4, valve 10 is shown in its drain position 14. FIGS. 5 and 6 illustrate valve 10 in its pressure position with two alternative positions of check valve assembly 28. As shown in these figures, coil assembly 29 includes an encapsulated solenoid coil, and envelopes an armature 56 received within a solenoid chamber 58 of housing 32. Armature 56 is biased within chamber 58 by biasing spring 16 to urge armature 56 to a biased position, preferably drain position 14. In the presently preferred embodiment, armature 56 is formed with a hollow center region 60 for receiving biasing spring 16. Center region 60 and the areas of solenoid chamber 58 not occupied by armature 56 or biasing spring 16 are flooded with fluid and communicate with the internal structure of valve body 30 as described below.

Armature 56 is coupled to a spool assembly 62 within valve body 30 for shifting spool assembly 62 between the operative positions of valve 10. Spool assembly 62 includes a hollow spool 64 terminating on one end with an attachment button 66 and open on the opposite end 68. Spool assembly 62 further includes a plunger or extension 70 coupled to spool 64 by means of a connecting pin 72 received within aligned bores 74 and 76 of spool 64 and extension 70, respectively. Between attachment button 66 and bore 74, spool 64 includes an area of reduced diameter 78. Area 78 is received within a slot 80 formed in an end of armature 56 such that attachment button 66 fits within a larger slot in armature 56 adjacent to slot 80. Slots 80 and 82 in armature 56 thus capture attachment button 66 and form abutment surfaces for contacting attachment button 66 for forcing spool 64 to slide within valve body 30 in response to biasing force from spring 16 or actuating (retracting) force from armature 56 upon energization of coil 54.

Spool 64 is thus slidingly received within valve body 30 and includes a pair of lands 84 and 86 machined for close tolerance fit within valve body 30. Lands 84 and 86 are separated by an area of reduced diameter 88 through which a plurality of apertures 90 are formed for permitting flow through pressure port 20 or drain port 22, depending upon the position of spool 64 within valve body 30. Apertures 90 thus communicate fluidly between area of reduced diameter 88 and the interior 92 of spool 64.

Open end 68 of spool 64 is positioned adjacent to check valve assembly 28. Check valve assembly 28 includes a seat 94 lodged within an enlarged end chamber 96 of valve body 30, a ball 98, a biasing spring 100 and a cap 102 fitted within enlarged end chamber 96. Cap 102 includes apertures 104 and internal guiding surfaces 106. Apertures 104 allow fluid to flow freely through check valve assembly 28, while guiding surfaces 106 guide ball 98 in its motion within assembly 28 as described in greater detail below.

As best illustrated in FIG. 4, extension 70 of spool assembly 62 includes an elongated tapered portion 108 of sufficient length to extend through open end 68 of spool 64 and through a central aperture 110 of seat 94. In the de-energized position illustrated in FIG. 4, biasing spring 16, which has a larger spring constant than biasing spring 100, urges armature 56 to the left, thereby urging extension 70 into contact with check ball 98 and unseating check ball 98. A fluid path is thereby opened between actuator section 36 and drain section 38, through check valve assembly 28 and the interior 92 of spool 64. Thus, in the de-energized position, the embodiment illustrated in FIG. 4 establishes a fluid flow path between drain port 24 and actuator port 22. Because land 86 of spool 64 overlies pressure port 20 in this position, pressure port 20 is effectively blocked.

Upon energization of solenoid coil 54, armature 56 is drawn to the right as illustrated in FIGS. 5 and 6, compressing biasing spring 16 and drawing spool assembly 64 to the right by virtue of engagement of attachment button 66 within armature 56. In this position, land 84 of spool 64 overlies drain port 24 while area 88 of spool 64 establishes a fluid communication path between pressure port 20 and the interior of spool 64. Also in this position, extension 70 of spool assembly 62 is withdrawn from check valve seat 94. FIG. 5 illustrates an orientation of check valve assembly 28 in a condition where pressure at pressure port 20 exceeds pressure at actuator port 22. In this condition, fluid from a source will be free to flow from pressure port 20 to actuator port 22 through spool 64, seat 94 and cap 102, around ball 98. Reverse flow through valve 10 is prevented in this position of spool assembly 62 as illustrated in FIG. 6. As shown in FIG. 6, where partial or total pressure is lost from pressure port 20, biasing spring 100 urges ball 98 to the right, into a seated position on check valve seat 94, thus interrupting flow from actuator port 22 to pressure port 20. In the event the pressure at port 20 again increases above the level at actuator port 22, ball 98 will be lifted from its seat 94 (against the force of biasing spring 100) and again permit flow through valve 10 from port 20 to port 22. When solenoid coil 54 is thereafter de-energized, biasing spring 16 again urges armature 56 to the left as illustrated in FIG. 4, shifting spool assembly 62 into its biased position and lifting ball 98 from its seat 94.

Figure 7:
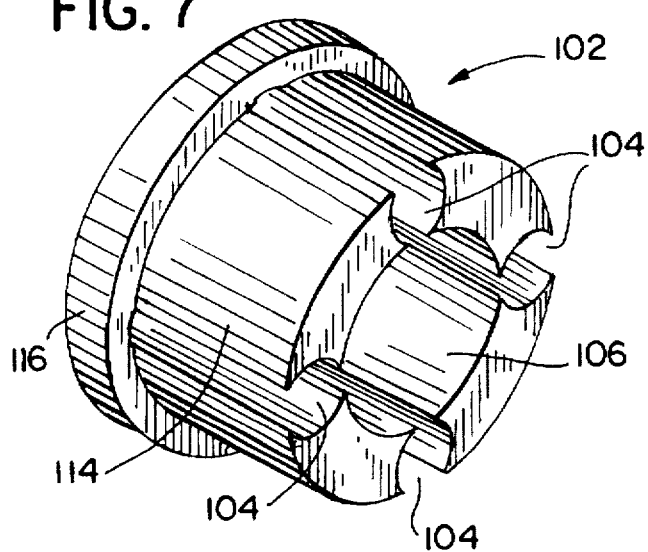
FIG. 7 is a perspective view of an end cap for the check valve section of the valve illustrated in the previous drawings for allowing flow to and from the actuator port and for centering the check valve ball.
Figure 8:
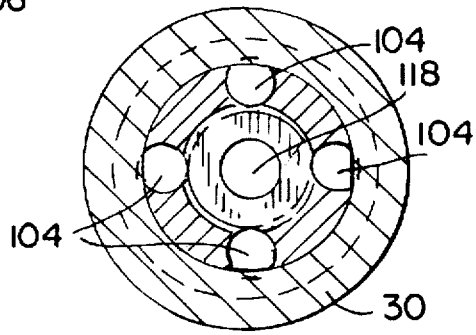
FIG. 8 is a sectional view through a section 8—8 of FIG. 4 illustrating the cap of FIG. 7 installed in the valve.

FIG. 7 illustrates a presently preferred configuration for cap 102 of check valve assembly 28. As shown in FIG. 7, cap 102 includes an annular body 112 through which apertures 104 are formed. Body 112 has an outer surface 114 which is interference fit within enlarged end chamber 96 of valve body 30 during assembly of valve 10. Cap 102 terminates in an enlarged annular region 116 which is press fit within a corresponding opening within enlarged end chamber 96. Cap 102 also includes guide surfaces 106 between apertures 104 for loosely contacting ball 98 and for receiving biasing spring 100. Guide surfaces 106 thus contact ball 98 and maintain ball 98 centered within check valve assembly 28 during operation of valve 10. As shown in FIG. 8, a central aperture 118 surrounding apertures 104.

Figure 9:
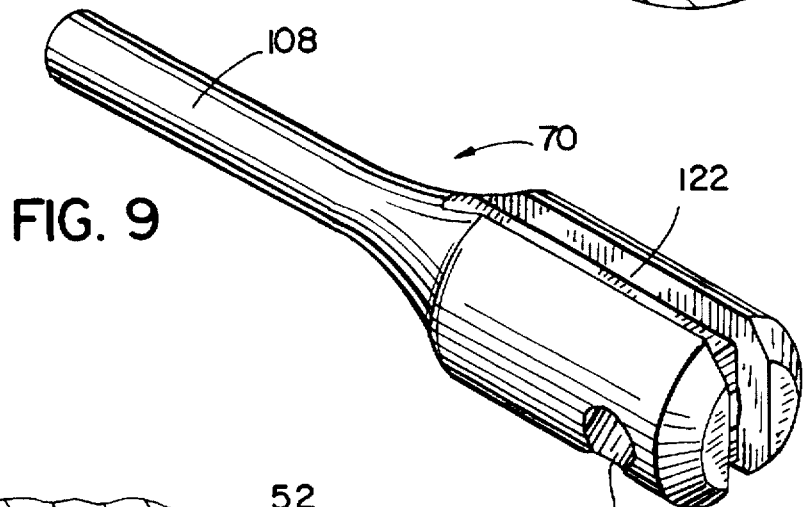
FIG. 9 is a perspective view of an extension for the spool assembly of the valve illustrated in the previous drawings.

As mentioned above, spool 62 includes a fluid passage 120 (see FIGS. 4, 5 and 6) extending through attachment button 66 and area of reduced diameter 78 for permitting the passage of fluid to and from solenoid chamber 58. In addition to passage 120, extension 70 includes an elongated passage 122 in the region of extension 70 coupled to spool 64, as shown in FIG. 9. Passage 122 is preferably formed as an elongated notch or groove extending from an end of extension 70 opposite tapered portion 108 and along the entire portion of extension 70 received within the closed end of spool 64. Bore 76 for receiving connecting pin 72 extends transversely to passage 122 as shown in FIG. 9. When assembled as shown in FIGS. 4, 5 and 6, solenoid chamber 58 is in fluid communication with interior 92 of spool 64 as follows. Hollow center region 60 of armature 56 terminates at attachment button 66 and is in fluid communication with passage 120 of spool 64. Fluid from passage 120 is free to flow through groove 122 of extension 70 to the interior 92 of spool 64. Accordingly, as armature 56 is moved by energization of solenoid 54, fluid is evacuated from solenoid chamber 58 through hollow center region 60 and passages 120 and 122. Conversely, upon de-energization of solenoid 54, armature 56 is urged back into its biased position by spring 16 and fluid may re-enter solenoid chamber 58 through passages 122 and 120.

Figure 10:
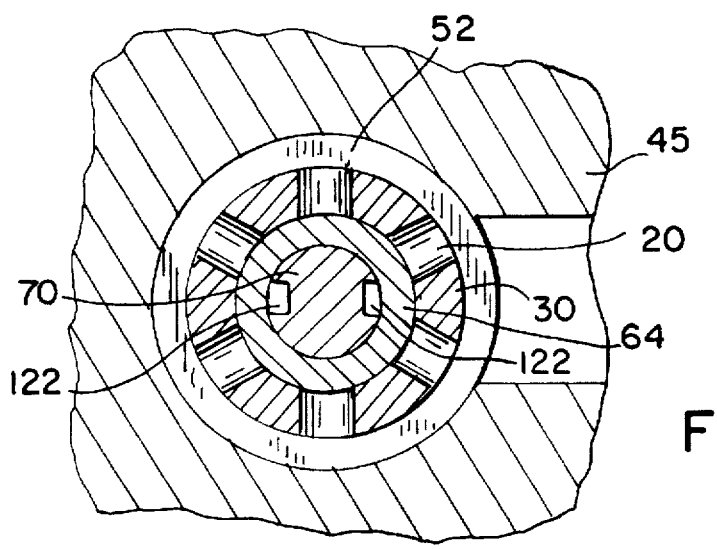
FIG. 10 is a partial sectional view through line 10—10 of FIG. 4 depicting flow paths around an extension shown in FIG. 9 for evacuating fluid from the armature compartment of the valve.

FIG. 10 illustrates the location of groove 122 of extension 70 when valve 10 is assembled and installed in a manifold structure 48. As shown in FIG. 10, valve 10 will be surrounded by a fluid conduit region 52 within manifold 48. Valve body 30, including passages for communicating fluid through spool 64, is centered within fluid conduit region 52 (passages illustrated in FIG. 10 being those associated with a pressure port 20). Within spool 64, extension 70 is lodged with grooves 122 extending along spool 64 between the end of extension 70 and the interior of spool 64. As illustrated in FIG. 10, in the presently preferred embodiment extension 70 includes two identical grooves 122 formed at diametrically opposed locations on extension 70 for communicating fluid around extension 70 and between solenoid chamber 58 and the interior 92 of spool 64.

As will be apparent to those skilled in the art, the preferred structure valve 10 described above presents distinct advantages with regard to manufacturer and assembly. In particular, valve 10 includes relatively few parts that can be assembled in a simple and straightforward manner. For assembly, spool assembly 62 is first pre-assembled by attaching extension 70 within spool 64 by means of pin 72. Spool 64 is then coupled to armature 56 by inserting attachment button 66 into groove 82. Armature 56 and spool assembly 62 may then be inserted into housing 32 with spring 16 being positioned within hollow central region 60 of armature 56. Check valve assembly 28 is also pre-assembled within valve body 30 by inserting seat 94, ball 98, and spring 100 into a valve body 30 and pressing cap 102 into position. Alternatively cap 102 may be threaded or otherwise attached into valve body 30, such as by a snap ring and groove structure. Valve body 30 is then assembled on housing 32 by sliding spool assembly 62 therethrough. Valve body 30 is secured to housing 32 by means of threaded engagement of corresponding surfaces of these two elements. In the presently preferred embodiment illustrated in the Figures, armature 56 is free to slide within housing 32, bounded on one end by valve body 30 and on the other end by the base of solenoid chamber 58.

While the invention is susceptible to various modifications and alternative forms, specific embodiments have been shown and described by way of example only. It should be understood that the invention is not intended to be limited to the particular forms disclosed. Rather, the invention is to cover all modifications, equivalents and variants falling within the spirit in scope of the invention as defined in the appended claims.

What is claimed is:

1. A reverse flow preventing hydraulic directional control valve comprising:
   a valve body having pressure, drain and actuator ports;
   a spool assembly slidable within the valve body between a first position wherein a flow path is defined between the pressure port and the actuator port, and a second position wherein a flow path is defined between the actuator port and the drain port;
   an armature coupled to the spool assembly;
   a solenoid coil supported relative to the armature, and energizable and de-energizable to move the armature such that the spool assembly is moved between the first and second positions; and
   a normally closed check valve supported within the valve body to open in response to fluid flow from the pressure port to the actuator port.

2. The valve of claim 1, wherein the spool assembly incudes an extension for unseating the check valve when the spool assembly is in the second position.

3. The valve of claim 2, wherein the extension is coupled to the armature.

4. The valve of claim 1, wherein the spool assembly is biased into the second position and is shifted to the first position by energization of the solenoid coil.

5. The valve of claim 1, wherein the valve body has a cartridge valve configuration.

6. The valve of claim 1, wherein the check valve is provided in an end of the valve body opposite from the solenoid coil.

7. The valve of claim 6, wherein the check valve includes a ball, a ball seat, a biasing spring and a cap, the cap substantially covering the end of the valve body and including at least one fluid communicating aperture.

8. The valve of claim 7, wherein the cap includes guide surfaces for guiding the ball.

9. A reverse flow preventing cartridge valve comprising:
   a cartridge body including pressure, drain and actuator openings;
   a shifting element within the body, the shifting element being selectively movable between an actuated position and a drain position, the shifting element and the cartridge body cooperating to define a first fluid path between the pressure and actuator openings in the actuated position and a second fluid path between the actuator and drain openings in the drain position;
   a solenoid including an armature coupled to the shifting element to move the shifting element between the actuated and drain positions; and
   a normally-closed check valve assembly supported within the cartridge body to open in response to flow from the pressure opening to the actuator opening.

10. The valve of claim 9, wherein the solenoid includes a solenoid coil energizable to move the armature and thereby to move the shifting element.

11. The valve of claim 10, wherein the armature is lodged in an armature compartment and the shifting element includes a fluid passage for permitting fluid flow between the shifting element and the armature compartment.

12. The valve of claim 9, wherein the shifting element includes an extension for contacting and unseating the check valve when the shifting element is in the drain position.

13. The valve of claim 9, wherein the shifting element is biased into the drain position.

14. A reverse flow preventing directional control cartridge valve comprising:
   a valve body having a solenoid assembly including a moveable element coupled at a first end thereof, an actuator port situated at a second end thereof opposite to the first end, and pressure and drain ports situated at intermediate positions therealong between the first and second ends;
   a spool assembly slidable within the valve body between a pressure position and a drain position, and coupled to the moveable element to move with the element, the spool assembly including an extension coupled to the moveable element, the spool assembly and the valve body cooperating to define fluid paths between the pressure and the actuator ports in the pressure position and between the actuator and drain ports in the drain position; and
   a normally-closed check valve assembly positioned adjacent to the second end of the valve body, the check valve assembly being configured to open in response to fluid flow from the pressure port to the actuator port and to close upon termination of the fluid flow to prevent fluid flow from the actuator port to the pressure port, the check valve assembly being maintained in an opened state by the extension when the spool assembly is in the drain position.

15. The valve of claim 14, wherein the check valve assembly includes a cap fitted to the second end of the valve body, the cap securing the check valve assembly to the valve body.

16. The valve of claim 15, wherein the cap includes at least one aperture for fluid flow through the check valve assembly.

17. The valve of claim 15, wherein the cap includes internal guide surfaces for guiding a movable check valve element between seated and unseated positions.

18. The valve of claim 14, wherein the extension is coupled to a spool of the spool assembly and extends therethrough to the check valve assembly.

19. The valve of claim 14, wherein the spool assembly is biased into the drain position.

20. The valve of claim 14, wherein the solenoid assembly includes a solenoid and the moveable element is an armature, the armature being lodged in an armature chamber, and wherein the spool assembly includes a fluid passage for permitting fluid flow to and from the armature chamber.

* * * * *